United States Patent [19]

Morgun et al.

[11] Patent Number: 5,163,526

[45] Date of Patent: Nov. 17, 1992

[54] FRICTION ELEMENT OF FRICTION PAIR

[75] Inventors: Vladimir V. Morgun; Sergei S. Lebedenko; Stepan I. Kravchun; Viktor P. Khupovka; Vyacheslav A. Boguslaev, all of Zaporozhie, U.S.S.R.

[73] Assignee: Zaporozhsky Avtomobilny Zavod "Kommunar" (Proizvodstvennoe Obiedinenie "AvtoZAZ"), Zaporozhie, U.S.S.R.

[21] Appl. No.: 613,855

[22] PCT Filed: Apr. 4, 1990

[86] PCT No.: PCT/SU90/00085

§ 371 Date: Dec. 6, 1990

§ 102(e) Date: Dec. 6, 1990

[87] PCT Pub. No.: WO90/12219

PCT Pub. Date: Oct. 18, 1990

[30] Foreign Application Priority Data

Apr. 4, 1989 [SU] U.S.S.R. ............................. 4672584
Jul. 10, 1989 [SU] U.S.S.R. ............................. 4716748
Sep. 15, 1989 [SU] U.S.S.R. ............................. 4766345
Jan. 18, 1990 [SU] U.S.S.R. ............................. 4784102

[51] Int. Cl.$^5$ ............................................. F16D 69/00
[52] U.S. Cl. ........................... 188/250 G; 188/251 M; 188/218 XL; 192/107 R
[58] Field of Search ....... 188/251 A, 251 M, 218 XL, 188/250 G, 218 R; 192/107 M, 107 R

[56] References Cited

U.S. PATENT DOCUMENTS

| | | | |
|---|---|---|---|
| 3,429,766 | 2/1969 | Stormfelz. | |
| 3,773,153 | 11/1973 | Smirl | 188/218 XL |
| 3,841,949 | 10/1974 | Black | 188/251 M X |
| 4,042,085 | 8/1977 | Bjerk et al. | 192/57 |
| 4,187,932 | 2/1980 | Zarembka | 188/251 M X |
| 4,278,153 | 7/1981 | Venkatu | 188/251 M |
| 4,501,347 | 2/1985 | Cerny et al. | 188/250 G |
| 4,995,500 | 2/1991 | Payvar | 188/218 XL X |

FOREIGN PATENT DOCUMENTS

| | | | |
|---|---|---|---|
| 0106782 | 4/1984 | European Pat. Off. . | |
| 3527577 | 2/1987 | Fed. Rep. of Germany | 188/218 XL |
| 0242837 | 9/1989 | Japan | 188/251 M |
| 312992 | 10/1971 | U.S.S.R. . | |
| 639482 | 12/1978 | U.S.S.R. . | |
| 846875 | 7/1981 | U.S.S.R. . | |
| 893587 | 1/1982 | U.S.S.R. . | |
| 921876 | 4/1982 | U.S.S.R. . | |
| 1038260 | 8/1983 | U.S.S.R. . | |
| 1516647 | 10/1989 | U.S.S.R. | 188/218 XL |
| 888444 | 1/1962 | United Kingdom | 188/251 M |

OTHER PUBLICATIONS

Fundamentals of Design, 1988 Article.

*Primary Examiner*—Charles A. Marmor
*Assistant Examiner*—Carla Mattix
*Attorney, Agent, or Firm*—Ladas & Parry

[57] ABSTRACT

The invention relates to friction pairs of machine parts.

A friction element of a friction pair comprises a three-dimensional framework (1) embedded in a matrix (2) in the zone of the friction surface (4).

The framework (1) is made from a wear-resistant material and the matrix (2) from a material with high heat conductivity coefficient. The framework (1) has a cellular shape formed by a honeycomb structure, a corrugated strip and the like. The framework rises partially above the surface of the matrix forming, together with the latter, a friction surface (4) possessing a regular microrelief. The area of the framework (1) rising above the matrix (2) diminishes proportionally in the direction from the maximum load zone towards the minimum load zone.

The invention can be used in braking mechanisms, in particular in brake disks and drums of passenger cars, in disks of friction clutches and the like.

22 Claims, 13 Drawing Sheets

FRICTION ELEMENT OF FRICTION PAIR

FIELD OF INVENTION

The invention relates to friction pairs of machine units and particularly to a friction element of a friction pair.

BACKGROUND OF THE INVENTION

U.S. Pat. No. 3,773,153 discloses a fabricated friction disk in which the outer parts are manufactured of steel and the core is made of corrugated aluminum plates.

The manufacture of disk outer parts from steel, with the same physical and mechanical properties over the entire friction surfaces, does not ensure uniform resistance to the destruction of different zones of the friction surfaces under the action of high temperature and mechanical stresses. Furthermore the use of steel in disk outer parts does not aid in damping oscillations and eliminating rattling during braking, the factors which adversely affect the serviceability of the unit.

From P. I. Orlov, "Fundamentals of Design", Reference handbook, Book 1, 1988, p. 131, it is known that the low strength and rigidity of light alloys prevent their use in support structures. For example, rolling bearings built in units made of light alloys are recommended to be mounted with the use of intermediate steel sleeves.

However, employment of reinforcing sleeves requires the increased expenditure of materials, increases the weight of construction and does not ensure optimum carrying capacity of the friction surface, tightness of the joint and resistance of the bearing to pressing out forces, thus reducing the service life of the friction disk.

SU, A,846875 discloses a friction element of a friction pair, which is essentially a brake disk comprising a three-dimensional framework, embedded in a matrix made from a material with a high coefficient of thermal conductivity. Each of the friction face surfaces of the disk is coated with a layer of wear-resistant material.

In the course of braking, heat is generated, which is removed from the disk friction surfaces by means of a liquid heat-transfer agent circulating in the framework.

However, since the load and heat stresses acting upon the friction surfaces in different zones are not uniform, and the properties of the friction material are the same over the friction surfaces, it is impossible to ensure uniform resistance to the destruction of different zones of the friction surfaces and to avoid rattling which results in premature failure of the disk.

Wear-resistant coating applied to the friction surfaces of the disk does not ensure their optimum carrying capacity.

DETAILED DESCRIPTION OF THE INVENTION

The object of the present invention is to provide a friction element of a friction pair that will assure uniform resistance to the destruction of different zones of the friction surface, in the course of operation, in conjunction with the optimum carrying capacity.

This object is attained by a friction element of a friction pair comprising a three-dimensional framework embedded in a matrix made from a material with a high heat conductivity coefficient, and a friction surface. According to the present invention, the framework is manufactured from a wear-resistant material, and is positioned at least in the zone of the friction surface having regular microrelief formed by the matrix and the framework face rising above the surface of the matrix.

The friction pair surfaces come in contact at the most rising parts. In the friction element these parts are the portions of the framework, which rise above the matrix, and since they are arranged discretely and regularly over the friction surface, the latter corresponds to the actual area of the contacting surfaces. All this results in minimum expenditure of wear-resistant material and consequently makes the friction element inexpensive to manufacture.

In addition, the design of the friction element improves the total rigidity and strength of the structure and reduces its mass.

Since the friction surface of the friction element is formed partially by the matrix made from a material with a high heat conductivity coefficient, the effectiveness of heat removal from the friction surface is improved, thus contributing to a longer service life of the unit as a whole.

It is expedient to manufacture the framework in the form of a cellular structure with the formation of cells. This will provide optimum carrying capacity for the friction surface and increase the serviceability and the service life thereof.

It is very expedient that the regular microrelief of the friction surface is of a cellular shape, which most advantageously influences the serviceability and the service life of the friction element. Such an embodiment of the friction element is advisable to be used in a brake drum of a passenger car, a step bearing and the like.

In the preferred embodiment of the invention, the area of the framework face surface, rising above the matrix surface, diminishes proportionally in the direction from the maximum load zone towards the minimum load zone.

The area of the framework face surface may be changed by changing the size of the cells and/or by changing the thickness of the cellular structure walls and/or by changing the density of the cells.

Due to strengthening of the element friction surface in the maximum load zone at the expense of the enlarged area of the framework face surface, the rate of wear of this zone in the course of the element operation becomes slower. Thus, conditions are created for uniform wear of the friction surface experiencing irregular thermal and mechanical stresses, which results in longer service life of the friction element.

It is expedient to make the friction element framework, in the maximum load zone, from a more wear-resistant material as compared with the minimum load zone.

In addition to the above advantages, such different uses of wear resistant materials allows a reduction in the cost of manufacturing the element.

It is highly expedient that in a friction element intended to be employed as a brake disk of a passenger car which has two friction surfaces, the configuration of the regular microrelief of one surface should differ from the configuration of the microrelief of the second surface. This structure will minimize the probability of self-sustained oscillations, resonant waveform, rattling and squeaks.

It is also advisable to place plates between the framework cells. Such plates will also contribute to the prevention of the above defects.

In one of the embodiments of the invention the friction element framework is made of a corrugated strip.

When such friction element is used in a brake drum of a passenger car, the strip should be wound in helix forming turns.

The advantage of the proposed construction of the friction element, over those described above, is that the friction element is easy to manufacture since the production of corrugated strips is more efficient and does not require much labor input.

It is also advisable that the framework should have a flat strip interlaid by turns of a corrugated strip.

Such construction prevents probable packing of the strips and thus aids in the qualitative formation of the friction element.

It is highly advisable that the framework should be made from at least of two coaxial parts wound in opposite directions.

Such construction allows for balancing of the axial component and for damping the vibration, thus increasing the service life of the friction element.

When the friction element is to be used in a brake disk of a passenger car, or a clutch disk, the corrugated strip should be wound in a spiral with the pitch of the spiral increasing in the direction from the center of the spiral towards its periphery.

As a result of the winding location, the friction material corresponds to the thermal and mechanical stresses acting upon the friction surface, i.e. it is more dense in the maximum load zone of the disk and less dense in the minimum load zone, thus favoring uniform resistance to the destruction of the friction surface.

The same aim is attained by manufacturing the corrugated strip with both the pitch and the height of the spiral increasing in the direction from the center of the spiral towards its periphery.

It is expedient that the friction element should be made rotatable and the direction of the spiral winding should correspond to the direction of rotation of the friction element.

It is expedient that the strips, and the framework, should be grooved. The grooves increase the surface of the frame, and improve its rigidity and strength.

In addition, it is expedient that at least one of the framework strips should be perforated. The perforation provides better anchoring of the strips in the matrix, and facilitate the dissipation of heat, thus making for a longer service life for the friction element.

It is very expedient that the direction of the spiral winding should correspond with the direction of rotation of the friction element, for example, the brake disk, so that during the operation it should experience compression stresses.

BRIEF DESCRIPTION OF THE DRAWINGS

Further objects and advantages of the proposed invention will become apparent from the following description in which its embodiments are set forth in detail with reference to the accompanying drawings, wherein.

DETAILED DESCRIPTION OF THE PREFERRED EMBODIMENT

A friction element of a friction pair comprises a three-dimensional framework 1 (FIGS. 1, 2, 3, 4) embedded in a matrix 2 manufactured from a material possessing a high heat conductivity coefficient.

Figure 5:
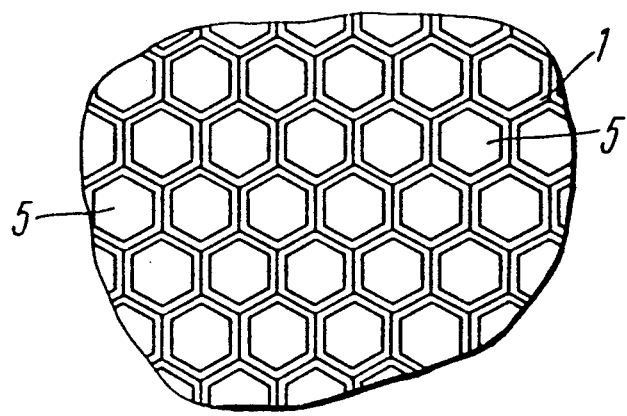
FIG. 5 is a fragmentary plan view of friction surface having a framework with hexagonal cells.
Figure 6:
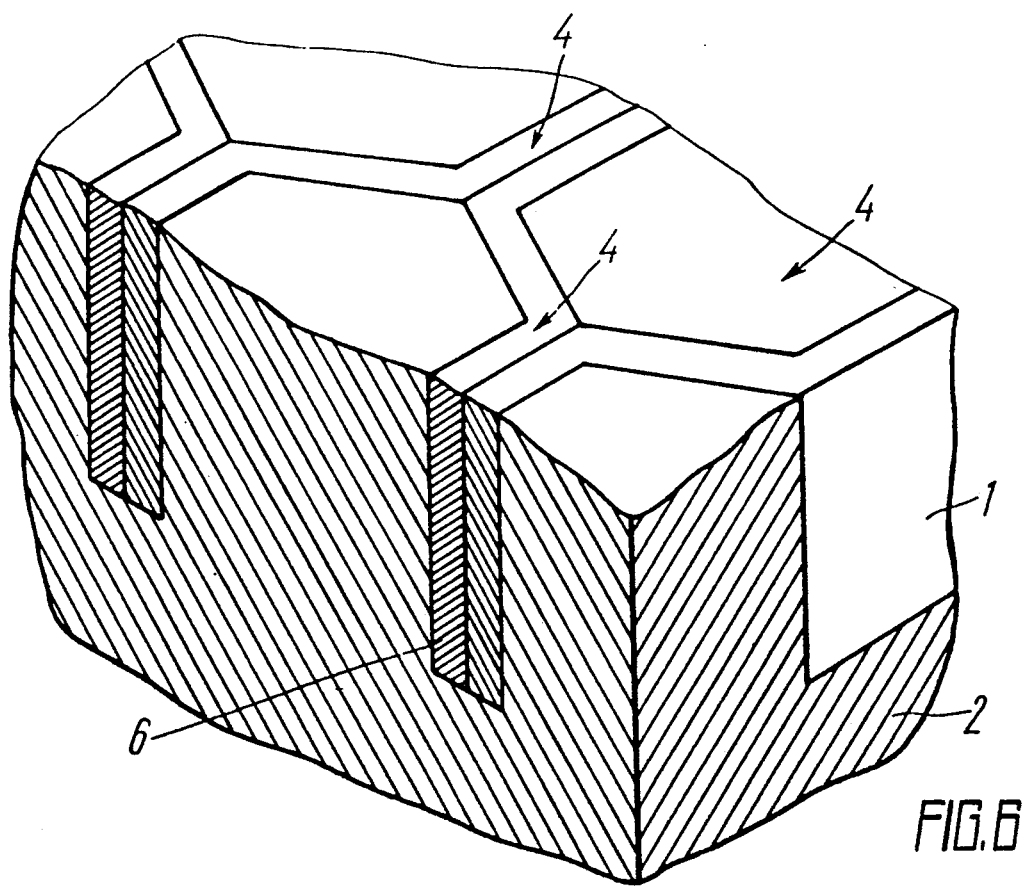
FIG. 6 is a fragmentary view of a friction element showing microrelief of the friction surface.
Figure 7:
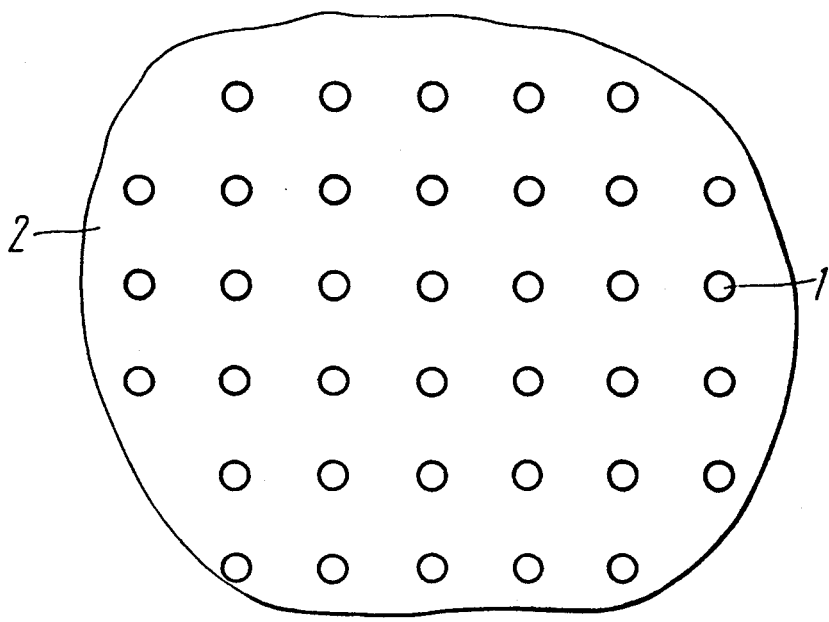
FIG. 7 is a fragmentary plan view of a friction element with a latticed framework.
Figure 8:
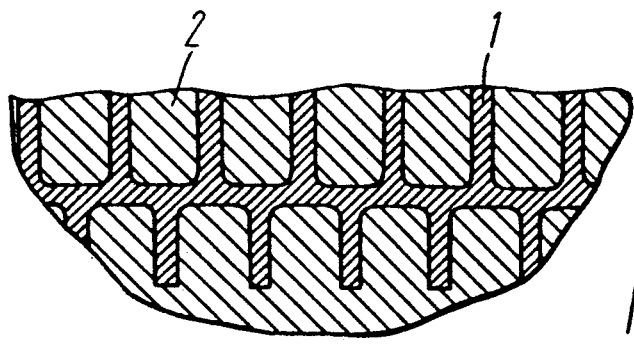
FIG. 8 is a fragmentary cross-sectional view of a friction element having a framework of a latticed construction.
Figure 9:
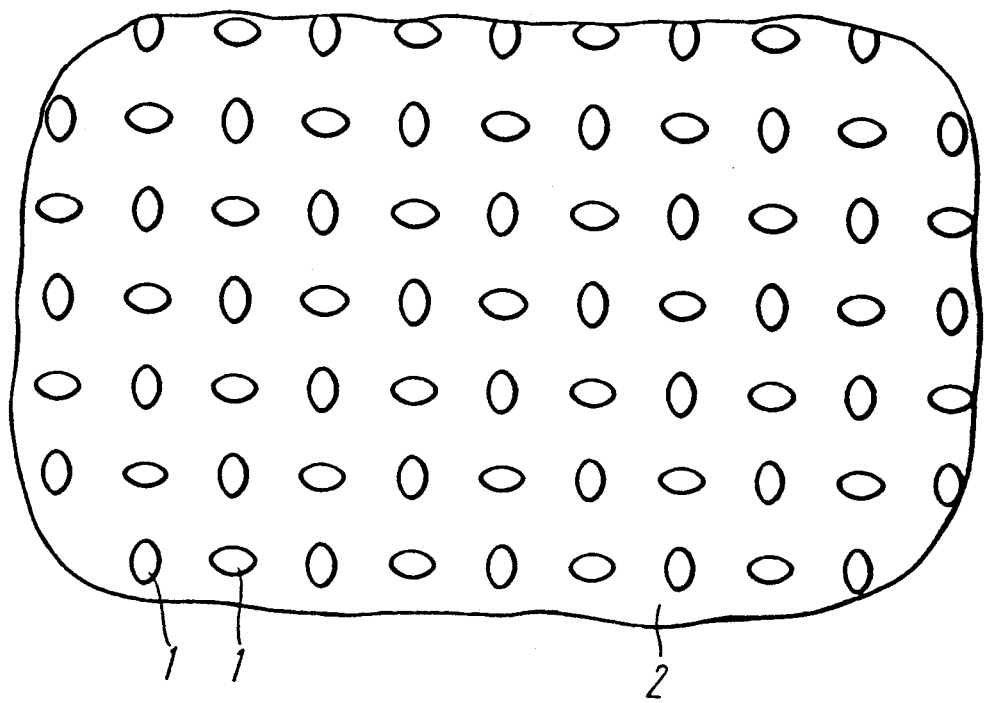
FIG. 9 is a fragmentary view of an alternate embodiment of the friction surface.
Figure 10:
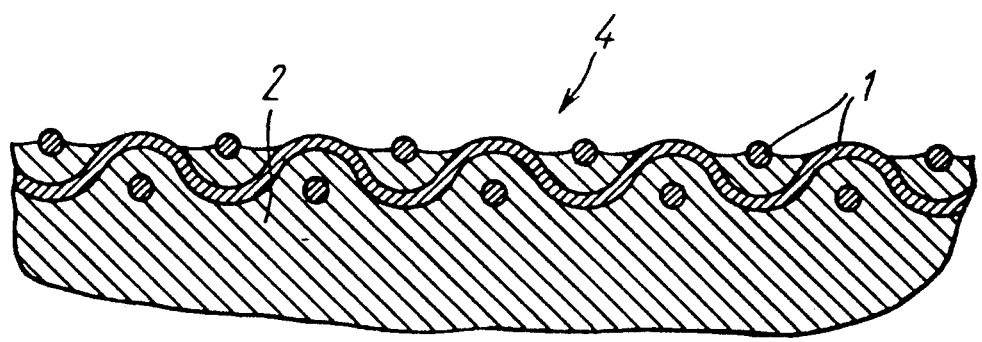
FIG. 10 is a fragmentary cross-sectional view of a friction element with a framework in the form of a three-dimensional lattice.
Figure 11:
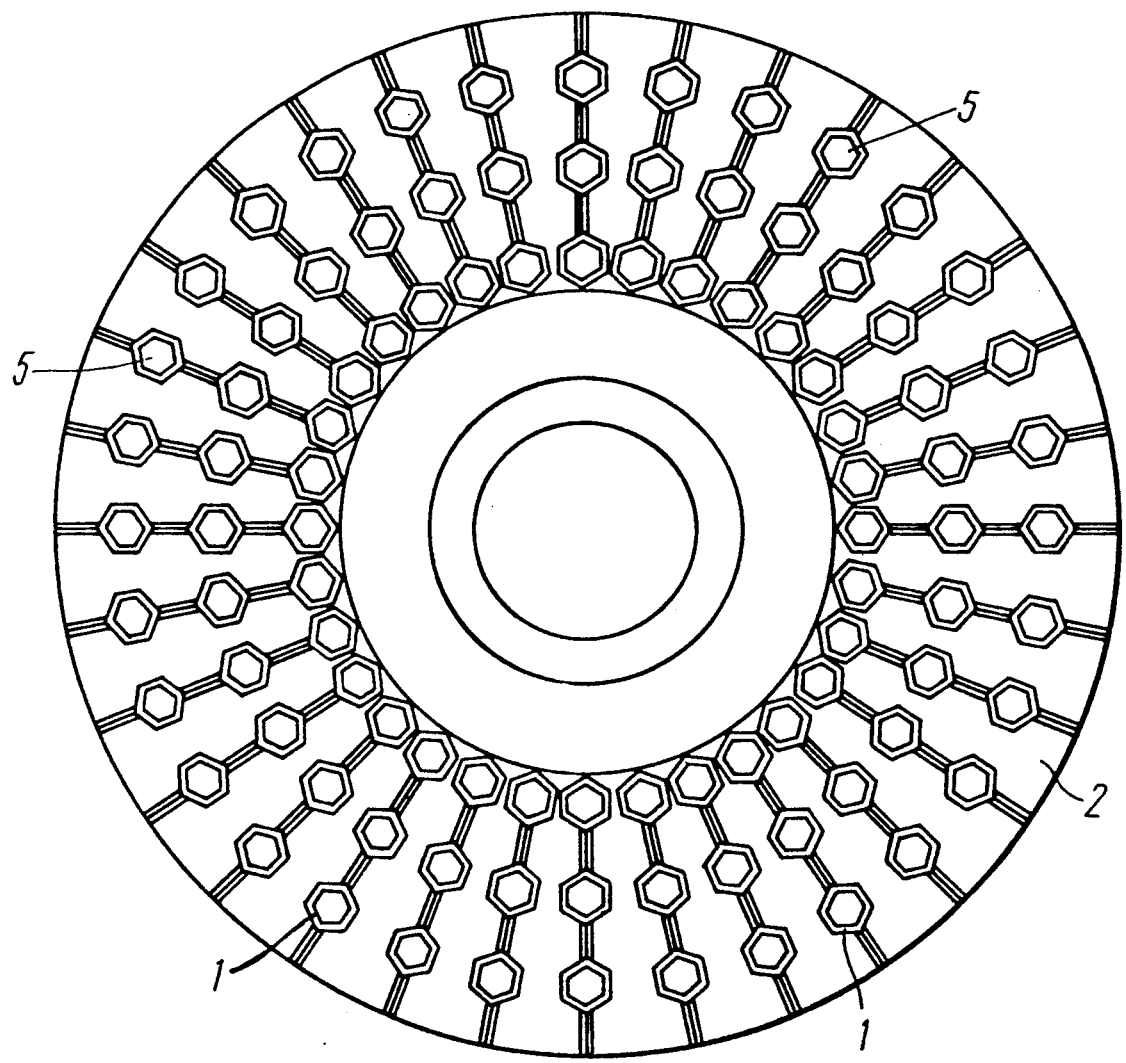
FIG. 11 is a plan view of a brake disk with different density of the framework cells on the friction surface.
Figure 12:
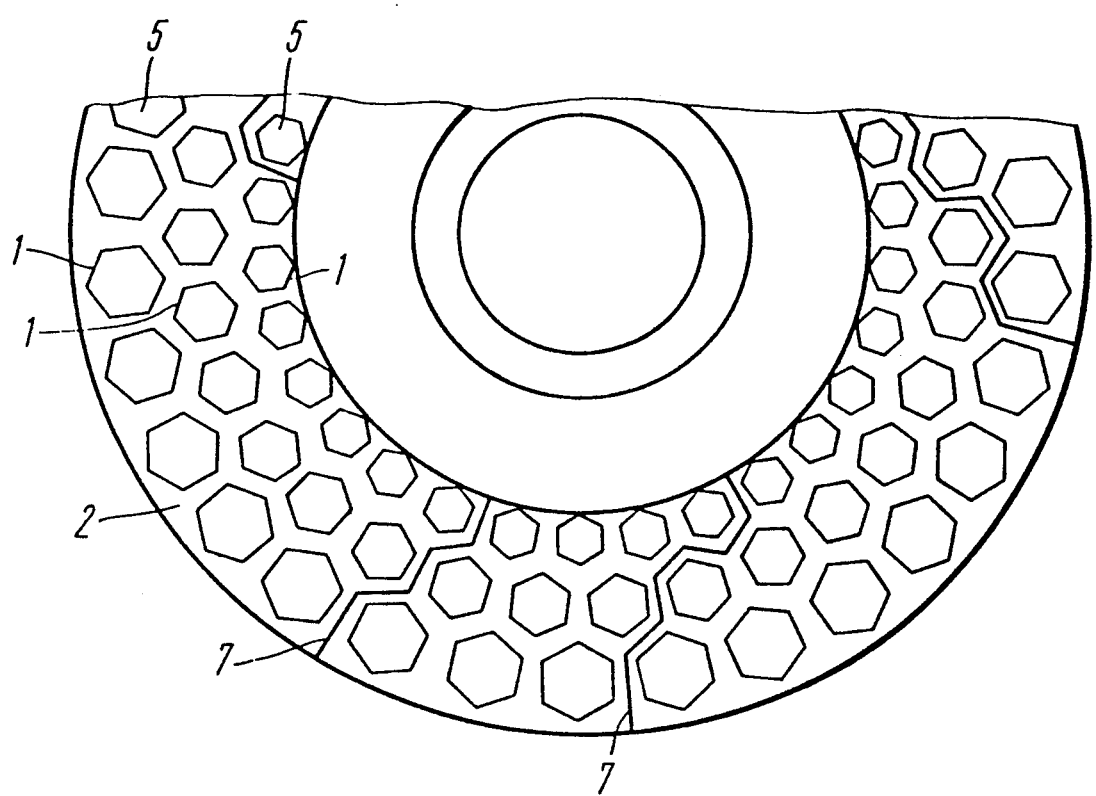
FIG. 12 is a plan view of a brake disk with different size of the framework cells on the friction surface and with plates placed between the cells.
Figures 13, 14, 15:
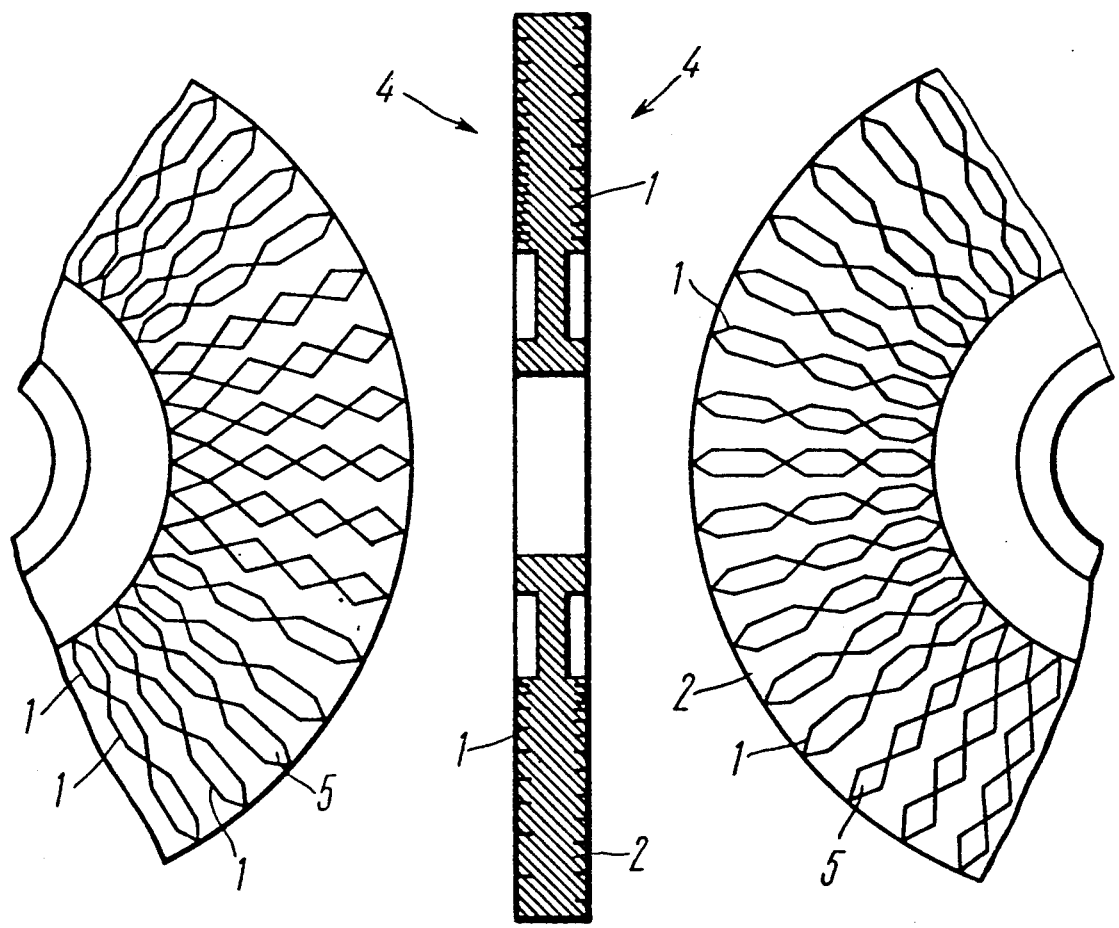
FIG. 13 shows a brake disk, the opposite friction surfaces of which have frameworks with cells of different configuration.
FIG. 14 is a left-side view of a brake disk shown in FIG. 13.
FIG. 15 is a right-side View of a brake disk shown in FIG. 13.

The framework 1 may be made in the form of a honeycomb (FIGS. 2, 4, 5), a lattice (FIGS. 7, 8) a three-dimensional network (FIGS. 9, 10) and the like, and is manufactured from wear-resistant material. The strength, heat stability and wear-resistance of the framework being higher than those of the heat-dissipating material of the matrix 2 incorporating the framework 1.

A framework 1, which is intended to be used in a brake drum of a passenger car, may be manufactured from steel, and the matrix 2 from an aluminum alloy.

For heavy-load friction units, the framework 1 and the matrix 2 are made, respectively, from alloys based on molybdenum, tungsten and copper.

The framework 1 has a coating 3 made of a material well compatible with the material of the framework 1 and the matrix 2 and which features high heat conductivity.

For coating of a Fe-based framework 1, and an Al-based matrix, it is expeditions to make use of copper.

The face surface of the framework 1 rises partially above the matrix 2 and forms together with the latter a friction surface 4 with discretely arranged sections of wear-resistant material, which sections come in contact with mating part of the friction pair during the operation thereof.

To add the rigidity to the friction element, the framework 1 may extend, not only adjacent the friction surface 4, but also through the whole volume of the friction element.

The area of the friction surface 4 occupied by the framework 1 covers 3 to 70% of the total area of the friction surface 4 and corresponds to the actual area of the surface contact.

Preferably, the friction element should be made in the form of a reinforced casting.

It may be also produced by sintering or spraying.

After the framework 1 is filled with heat-dissipating material of the matrix 2, the friction surface 4 should be finished to final shape, size and roughness.

As a result, it assumes the form of a surface with a regular microrelief.

When a honeycomb-type framework 1 is used, the friction surface 4 corresponds to a surface with completely regular microrelief, for example, of a hexagonal shape (FIGS. 2, 5, 6, 11, 12).

For a friction element employed in a brake disk of a passenger car, or in a clutch disk, it is most expedient to have the area of the face surface of the framework 1 diminish proportionally in the direction from the maximum load zone towards the minimum load zone (FIGS. 2, 11, 12, 13, 14, 15, 19).

It is known that the wear surface of a friction disk has a hyperbolic shape, therefore, due to gradually reducing pressure, the further the contact point of the friction surface is from the axis of rotation, the less deformation and wear.

Thus, in these disks the stresses arising during the operation reduce gradually towards the disk periphery.

The area of the face surface of the framework 1 may be changed in compliance with the varying stresses by changing the size of the frame cells 5 and/or by changing the thickness of its walls 6 and/or by changing the density of the cells 5.

In brake disks for passenger cars, which have two friction surfaces 4 (FIG. 13), each of them is strengthened by a framework 1 with a different configuration of cells 5 (for example, tetragonal and hexagonal), which form different contours of the regular microrelief (FIGS. 14, 15) or the disk friction surfaces are additionally reinforced by plates 7 distributed radially between the cells 5 of the framework 1 to avoid vibration.

The framework 1 may be manufactured from materials differing in the wear resistance. In the maximum load zones it may be made from a material possessing higher physical and mechanical properties as compared with the minimum load zones.

Figure 16:
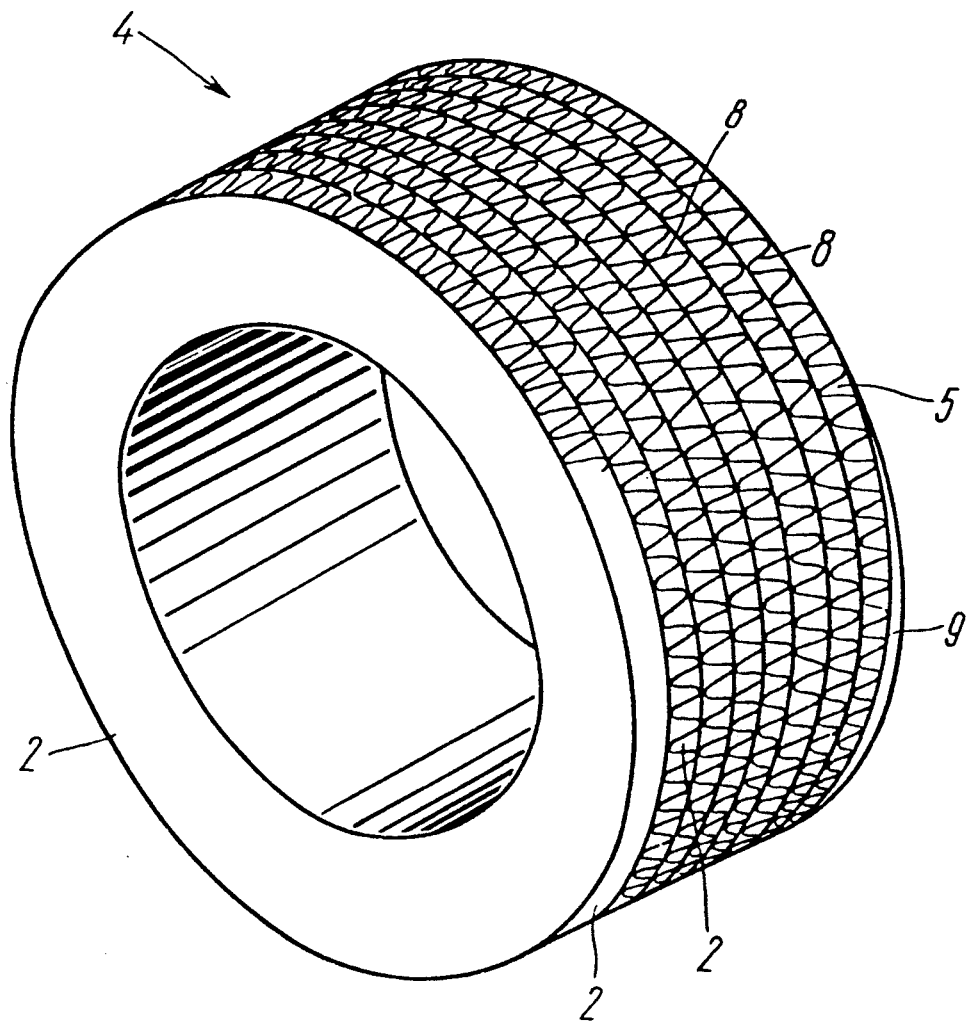
FIG. 16 shows a brake drum with a framework manufactured from a corrugated strip.

The framework 1 may be made from a corrugated strip 8 (FIG. 16). In a friction element intended to be used in a brake drum the corrugated strip 8 is usually wound in helix so that its turns are interlaid by a flat strip 9.

The strips 8, 9 are oriented with their face surfaces towards the friction surface 4 of the friction element, thus forming thereon a regular microrelief, the geometry thereof being defined by the geometry of cells 5 formed by the mentioned strips 8, 9.

Figure 17:
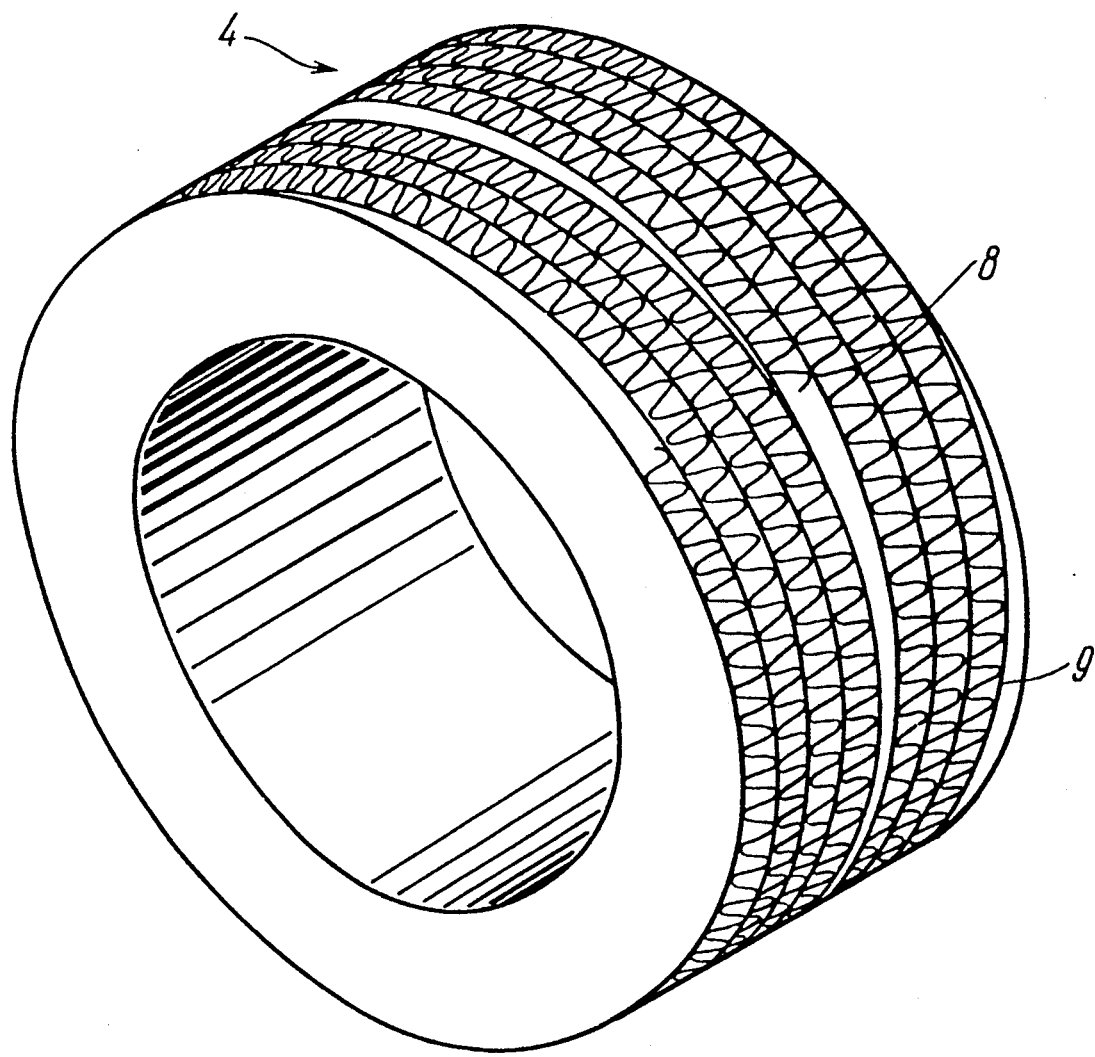
FIG. 17 shows a framework made up of two parts.
Figure 18:
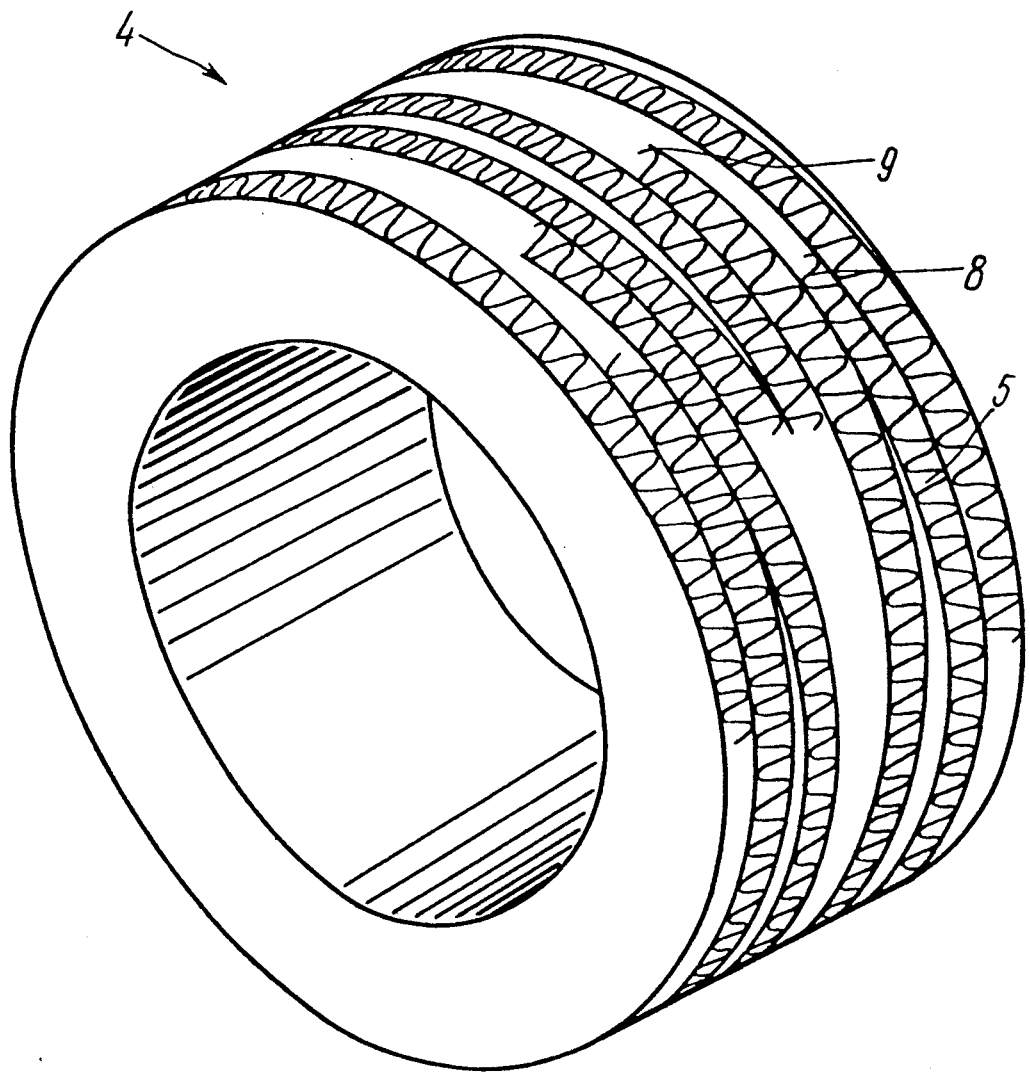
FIG. 18 shows a framework made of several pairs of strip turns wound in opposite directions.
Figure 19:
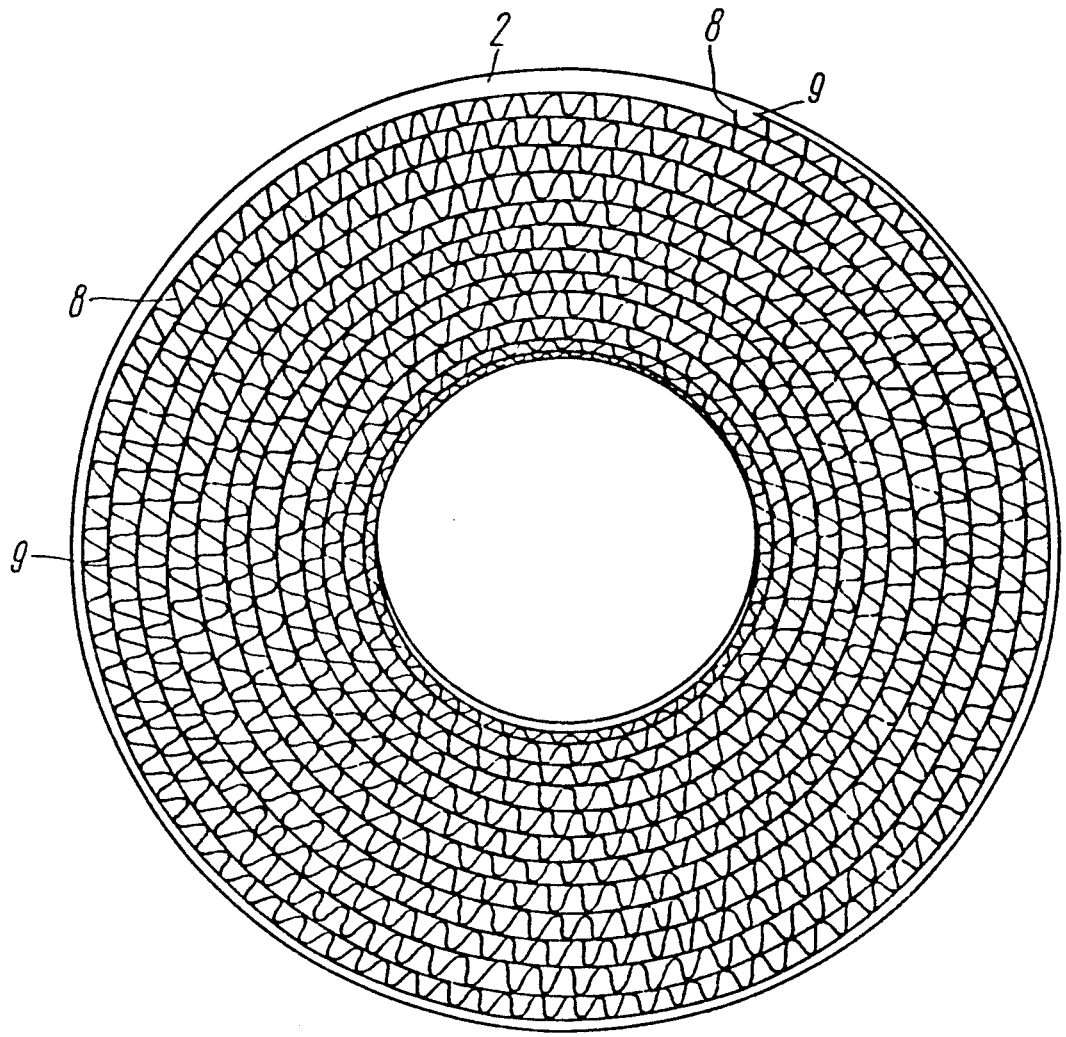
FIG. 19 shows a framework made in the form of a corrugated strip wound in flat spiral.

In a brake drum, such framework 1 is made from at least two coaxially positioned, oppositely wound parts (FIGS. 17, 18).

Each specialist in this field will easily understand that the construction of the claimed friction element is determined by conditions of its employment influencing on the selection of the size of corrugations and thickness of the strips 8, 9.

In a friction element intended to be used in a brake disk, the corrugated strip 8 forming the framework 1 is wound in a spiral with a pitch increasing in the direction from the center of the spiral towards its periphery (FIG. 19) in compliance with location of the load zones of the friction surface 4. The direction of winding corresponds to the direction of the friction element rotation, while the pitch and the height of the corrugations of the spiral increase in spiral length in the direction from the center of the spiral towards its periphery. The turns of the corrugated strip 8 are interlaid by the flat strip 9. The strips 8, 9 are oriented with their face surfaces towards the friction surface 4, thus forming thereon a regular microrelief the geometry thereof being defined by the geometry of the cells 5 formed by strips 8, 9.

When strips 8, 9 are wound in a spiral, their density is reduced respectively from the center of the spiral towards its periphery.

So, the friction material is situated on the friction surface in compliance with the loading thereof, i.e. with greater density in the maximum load zone and with lower density in the minimum load zone.

Figure 20:
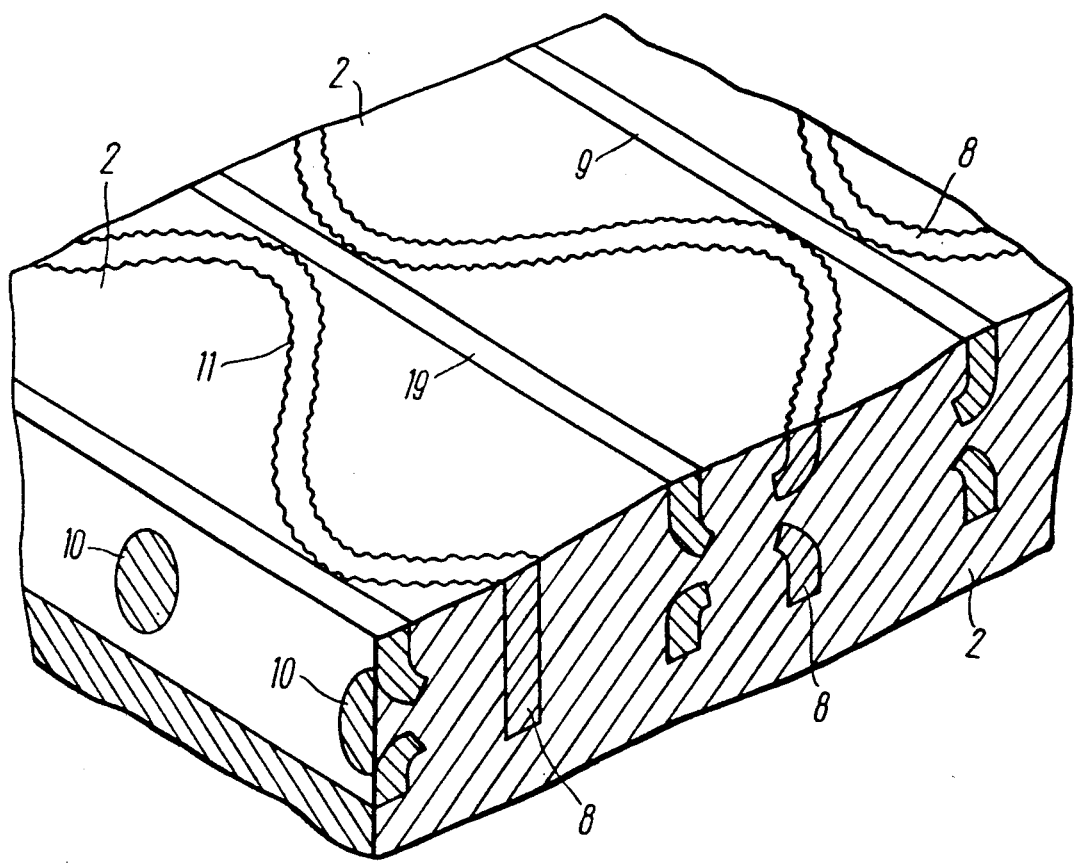
FIG. 20 is a fragmentary view of a friction element with a framework made of perforated and grooved strips.

To improve the anchoring effect of fastening the strips 8, 9 in the matrix 2, the strips 8, 9 are perforated; the perforation 10 (FIG. 20) adds to the intensification of the process of heat removal from the friction surface 4 into the material of the matrix 2.

The surface of the strips 8, 9 is provided with grooves 11 which enlarge the surface of the reinforcing framework 1 and improve in this way the rigidity and the strength thereof.

Figure 1:
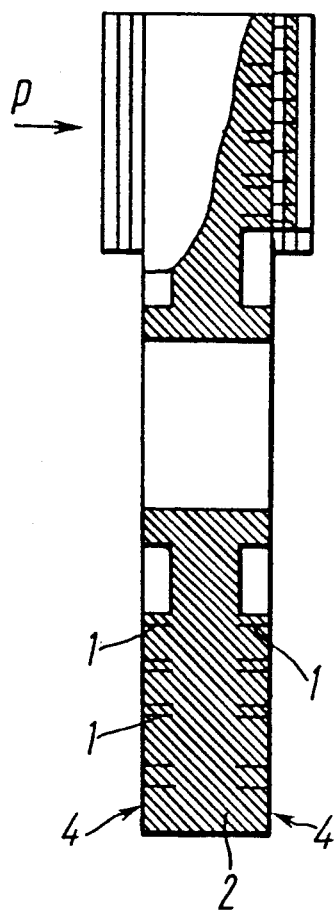
FIG. 1 shows a disk brake according to the invention.
Figure 2:
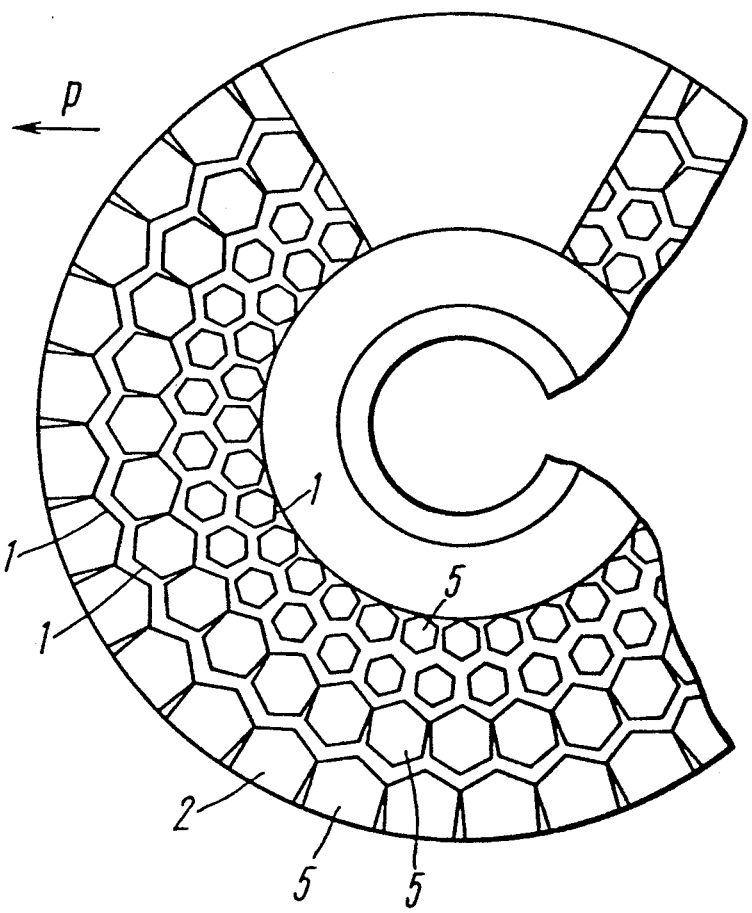
FIG. 2 is a plan view of a disk brake.
Figure 3:
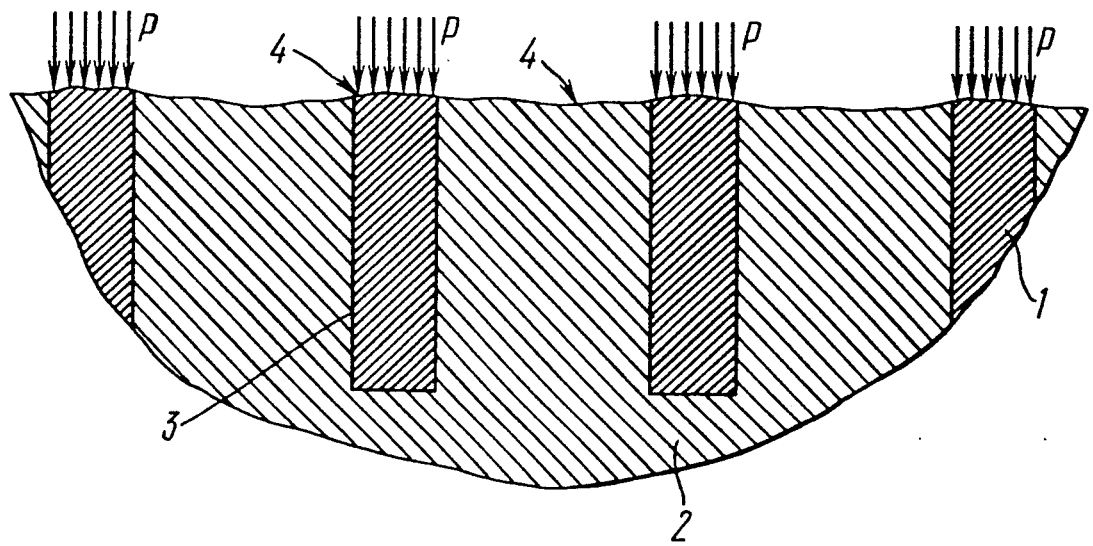
FIG. 3 is a fragmentary cross-sectional view of a friction surface.
Figure 4:
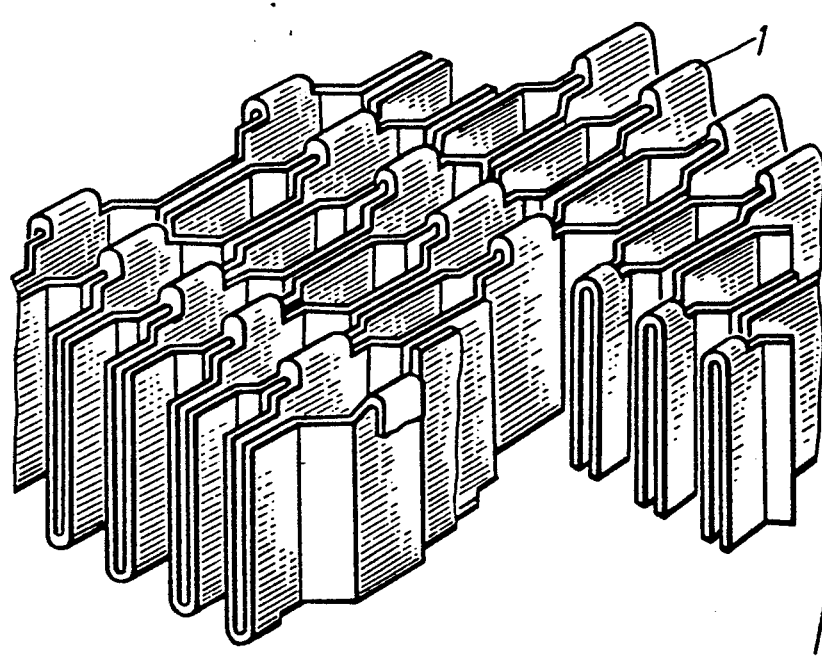
FIG. 4 is a perspective view of a cellular structure framework.

Described below is operation of a friction element exemplified by its use in a brake drum of a passenger car, i.e. a disk with two friction surfaces 4. These surfaces are subjected to the action of forces corresponding to the pressure force P of brake blocks (FIG. 1). The two friction surfaces 4 come in contact with the brake blocks over the most rising parts. In the claimed friction element these most rising parts are the face surfaces of the framework 1, discretely rising above the surface of the matrix 2 and forming the regular microrelief.

In the course of the braking, the friction surfaces 4 generate heat which is removed from the framework 1 through the heat-dissipating material of the matrix. This process is favored by coating 3 available on the framework 1 and which is characterized by high heat conductivity and compatibility with the heat conducting material of the matrix. The coating 3 excludes a heat barrier between the framework 1 and the matrix 2 thus making the heat dissipate through the whole volume of the friction element.

The proposed friction element can also be used as a support structure, for example, as a bearing sleeve with a friction surface made and functioning as described above.

The discrete and regular arrangement of the friction material on the friction surfaces and conductive cooling through the heat dissipating material of the matrix allow for the stabilization of temperature patterns and wear resistance, thus increasing the service life of the friction element.

INDUSTRIAL APPLICABILITY

The invention can be used in braking mechanisms, particularly in passenger cars, in clutch disks, various support structures and the like.

We claim:

1. A friction element of a friction pair comprising a three-dimensional framework made from a wear-resistant material and embedded in a matrix made from a material with a high conductivity coefficient, and a friction surface, wherein the framework is positioned at least in a zone of the friction surface, and wherein the friction surface has a regular microrelief formed by both the matrix and a face surface of the framework that rises above the matrix.

2. A friction element according to claim 1, wherein the framework is made in the form a cellular structure with cells.

3. A friction element according to claim 2, wherein the regular microrelief of the friction surface has a cellular shape.

4. A friction element according to claim 1, wherein the area of the face surface of the framework rising above the matrix diminishes proportionally in a direction from a maximum load zone of the framework towards a minimum load zone of the framework.

5. A friction element according to claim 2, wherein the size of the cells diminishes proportionally from a maximum load zone of the framework towards a minimum load zone of the framework.

6. A friction element according to claim 4, wherein the face surface of the framework changes from the maximum load zone towards the minimum load zone.

7. A friction element according to claim 2, wherein the cells of the framework are positioned so that the density of the cells changes proportionally from a maximum load zone of the framework towards a minimum load zone of the framework.

8. A friction element according to claim 2, further comprising an additional friction surface with an additional regular microrelief differing in configuration from the regular microrelief of the friction surface.

9. A friction element according to claim 8, further comprising plates placed between the cells of the framework on the friction surface and the additional friction surface.

10. A friction element according to claim 9, wherein the framework is made from materials having different wear resistances, and wherein the material in the maximum load zone of the framework features higher wear resistance than in the minimum load zone of the framework.

11. A friction element according to claim 1, wherein the framework is made from a corrugated strip.

12. A friction element according to claim 11, wherein the corrugated strip is wound in helix forming turns.

13. A friction element according to claim 12, wherein the framework has a flat strip interlaid by turns of the corrugated strip.

14. A friction element according to claim 12, wherein the framework is made at least from two coaxially positioned parts wound in opposite directions.

15. A friction element according to claim 11, wherein the corrugated strip is wound in a spiral, and wherein a pitch of the spiral increases radially in a direction from a center of the spiral towards a periphery of the spiral.

16. A friction element according to claim 15, wherein the pitch and height of the corrugations of the corrugated strip increase along the length thereof in the direction from the center of the spiral towards the periphery.

17. A friction element according to claim 15, wherein the friction element is rotatable and the direction of the spiral winding corresponds to the direction of rotation of the friction element.

18. A friction element according to claim 13, wherein the flat and corrugated strips are provided with grooves.

19. A friction element according to claim 18, wherein at least one of the flat and corrugated strips are perforated.

20. A friction element according to claim 1, wherein the friction element is a car disk brake.

21. A friction element according to claim 1, wherein the friction element is a passenger car brake drum.

22. A friction element according to claim 1, wherein the friction element is a friction disk of a friction clutch.

* * * * *